US006755664B2

(12) United States Patent
Sakamoto et al.

(10) Patent No.: US 6,755,664 B2
(45) Date of Patent: Jun. 29, 2004

(54) JOINT RECEIVING CONNECTOR

(75) Inventors: Masami Sakamoto, Toyota (JP); Shigeki Mori, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/379,530

(22) Filed: Mar. 6, 2003

(65) Prior Publication Data

US 2003/0176103 A1 Sep. 18, 2003

(30) Foreign Application Priority Data

Mar. 18, 2002 (JP) .................................... P2002-073649

(51) Int. Cl.[7] ......................... H01R 29/00; H02B 1/056

(52) U.S. Cl. .......................................... 439/49; 439/715

(58) Field of Search ................................ 439/49, 540.1, 439/701, 715

(56) References Cited

U.S. PATENT DOCUMENTS 3,829,821 A 8/1974 Derr et al.
4,099,821 A 7/1978 Debaigt

FOREIGN PATENT DOCUMENTS

EP 1 041 676 A2 10/2000
JP 59-35379 2/1984

*Primary Examiner*—Javaid H. Nasri
(74) *Attorney, Agent, or Firm*—Sughrue Mion, PLLC

(57) ABSTRACT

In a connector assembly for receiving a plurality of mating connectors each provided with a wire harness, each of subassemblies is provided with a first internal space and a second internal space which are defined by an internal partition wall, and conductive tabs piercing the partition wall so as to project into both of the first internal space and the second internal space. The subassemblies are stacked one on another. Each of the connectors is inserted into the first internal space of an associated one of the subassemblies. Terminals are provided in each of the connectors to be electrically connected to the conductive tabs. A first end of an electric wire is connected to one of the terminals which is provided in one of the connectors. A second end of the electric wire is connected to another one of the terminals which is provided in another one of the connectors. Each of the mating connector is inserted into the second internal space of an associated one of the subassemblies, to be electrically connected to the conductive tabs.

10 Claims, 8 Drawing Sheets

JOINT RECEIVING CONNECTOR

BACKGROUND OF THE INVENTION

The present invention relates to a joint receiving connector for receiving a joint of a wire harness, and a method for manufacturing the same.

FIGS. 12, 13 and 14 show such a joint receiving connector.

In FIG. 12, an electric junction box 101 is constructed to have an upper case 102 and a lower case 103 made of synthetic resin. There are formed in the upper case 102, a plurality of housings 106 each of which is adapted to be connected with a terminal connector 105 of a wire harness 104. Moreover, there are formed a plurality of slits 107 in the lower case 103.

Into the slits 107, there are inserted longitudinal bus bars 108 having electrical conductivity for receiving the joint, and a plurality of tabs 109 continuously formed on the longitudinal bus bars 108 are adapted to project into the housings 106 via a plurality of through holes 110. The upper case 102 and the lower case 103 are so designed as to be integrated with each other by way of engagement between locked portions 111 formed on the upper case 102 and locking hooks 112 formed on the lower case 103, so that a plurality of the longitudinal bus bars 108 can be clamped between these upper case 102 and the lower case 103.

In FIGS. 13 and 14, both an upper surface 121*a* and a lower surface 121*b* of a connector housing 121 are designed as joining faces. There are formed housing lock projections 122 in forward areas of the upper joining face 121*a*. There are also formed housing lock grooves 123 on the lower joining face 121*b* corresponding thereto.

The connector housing 121 has a plurality of terminal cavities 125 which are partitioned by respective cavity walls 124. In the respective terminal cavities 125, a plurality of crimp terminals 126 are respectively contained in a state engaged with fitting holes 121*c*.

Each of the crimp terminals 126 is constructed to have a wire crimping portion 126*a* to which an electric wire W is crimped, a locked portion (not shown) to be locked to the connector housing 121, a tab portion 126*c* adapted to project from the upper joining face 121*a*, and a tab contact 126*d* to which the tab portion 126*c* inserted from the lower joining face 121*b* is brought into contact.

A coupling part 128 couples two laterally adjacent crimp terminals 126 to each other. A cut-out 129 is formed in each of the cavity walls 124 so that the coupling part 128 is adapted to couple the adjacent crimp terminals 126 to each other astride the cut-out 129.

On the basis of the above described structure, operation of mounting the terminals to the connector housing 121, and coupling operation between the connector housings 121 will be described.

The crimp terminals 126 are inserted into a plurality of the terminal cavities 125 of the connector housing 121 from back faces thereof. When the crimp terminals 126 have been respectively inserted up to mounting positions, the locked portions (not shown) of the crimp terminals 126 are engaged with the connector housing 121. Then, by conducting treatments such as crimping the electric wires W to the wire crimping portions 126*a* of the crimp terminals 126 and so on, the electric wires W and the crimp terminals 126 are connected with each other.

Subsequently, by moving the connector housings 121 in such a direction that the joining faces 121*a* and 121*b* of the two connector housings 121 may come close to each other, positional alignment of the housing lock projections 122 and the housing lock grooves 123 is performed. After then, by further moving the connector housings 121 in the direction in which the joining faces 121*a* and 121*b* of both the connector housings 121 may come close to each other, the joining faces 121*a* and 121*b* are joined to each other, so that the housing lock and the coupling operation are completed.

On this occasion, along with the movement of both the connector housings 121 to the coupled position, the tab portions 126*c* of the crimp terminals 126 in the lower connector housing 121 are introduced into the upper connector housing 121 through the fitting holes 121*c*, to be brought into contact with the tab contacts 126*d* of the respective crimp terminals 126 in the upper connector housing 121. It is to be noted that in case where the upper and lower crimp terminals 126 are not intended to be electrically connected, folding work for folding the tab portions 126*c* should be conducted in advance.

As described above, by laminatedly coupling the connector housings 121, a joint connector assembly 130 is constructed. This joint connector assembly 130 is constructed in such a manner that the vertically adjacent crimp terminals 126 and the laterally adjacent crimp terminals 126 can be electrically interconnected, according to requirement.

In the above electrical junction box 101, the arrangement of the connectors is previously fixed, and therefore, upon receiving a joint of a wire harness, arrangement adaptation has to be performed in the wire harness side to match with the requirement predetermined in the junction box side. Consequently, productivity of the wire harness cannot be enhanced.

In addition, the joint connector assembly 130 cannot be provided with such a function as complying with the arranging requirements of the wire harness side.

SUMMARY OF THE INVENTION

It is therefore an object of the invention to provide an economical joint receiving connector having a function capable of complying with the arranging requirements of the wire harness side, and a method for manufacturing the same.

In order to achieve the above object, according to the invention, there is provided A connector assembly for receiving a plurality of mating connectors each provided with a wire harness, comprising:

a plurality of subassemblies, each provided with a first internal space and a second internal space which are defined by an internal partition wall, and conductive tabs piercing the partition wall so as to project into both of the first internal space and the second internal space, the subassemblies being stacked one on another;

a plurality of connectors, each of which is inserted into the first internal space of an associated one of the subassemblies;

a plurality of terminals, provided in each of the connectors to be electrically connected to the conductive tabs; and at least one electric wire, a first end of which is connected to one of the terminals which is provided in one of the connectors, and a second end of which is connected to another one of the terminals which is provided in another one of the connectors, wherein each of the mating connector is inserted into the second internal space of an associated one of the subassemblies, to be electrically connected to the conductive tabs.

Preferably, the connectors connected by the electric wire is so selected as to match with a wire arranging requirement of the wire harness.

In such a configuration, it is capable of complying with the arranging requirements of the wire harness, so as to contribute to enhancement of the productivity of the wire harness. Moreover, alteration of the arrangement can be easily made, irrespective of conditions such as vehicle grade, shipment destination or the like, so that needless circuits can be decreased, and that the cost can be cut down.

Preferably, the terminals includes a chained terminal which electrically connects adjacent ones of the terminals.

Here, it is preferable that a position at which the chained terminal is provided is so selected as to match with an wire arranging requirement of the wire harness.

In such a configuration, variation of arrangement of the terminals in compliance with the arranging requirements of the wire harness can be increased. It is also advantageous that needless circuits can be decreased.

Preferably, each of the subassemblies is provided with an engaging member which engages with a stacked one of the subassemblies.

In such a configuration, the stacking operation of the subassemblies can be facilitated.

According to the invention, there is also provided a method of manufacturing a connector assembly, comprising steps of:

- providing a plurality of subassemblies, each provided with a first internal space and a second internal space which are defined by an internal partition wall, and a conductive tab piercing the partition wall so as to project into both of the first internal space and the second internal space;
- stacking the subassemblies one on another;
- providing a plurality of connectors, each of which is provided with a plurality of terminals;
- connecting a first end of an electric wire to one of the terminals which is provided in one of the connectors;
- connecting a second end of the electric wire to another one of the terminals which is provided in another one of the connectors;
- inserting each of the connectors into the first internal space of an associated one of the subassemblies, so that the terminals are electrically connected with the conductive tabs;
- providing mating connector each provided with a wire harness; and
- inserting each of the mating connector into the second internal space of an associated one of the subassemblies, to be electrically connected to the conductive tabs.

Preferably, the step of providing the connectors includes steps of: providing an insulating body; fixing the terminals on the insulating body; and dividing the insulating body to form the connectors.

In such a configuration, working efficiency in the connector forming process will be enhanced, and that the manufacturing of the joint receiving connector can be facilitated.

Preferably, the connectors connected by the electric wire is so selected as to match with an wire arranging requirement of the wire harness.

Preferably, the step of providing the connectors includes step of providing a chained terminal which electrically connects adjacent ones of the terminals.

Here, it is preferable that a position at which the chained terminal is provided is so selected as to match with an wire arranging requirement of the wire harness.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Preferred embodiments of the present invention will be described with reference to the accompanying drawings.

Figure 1:
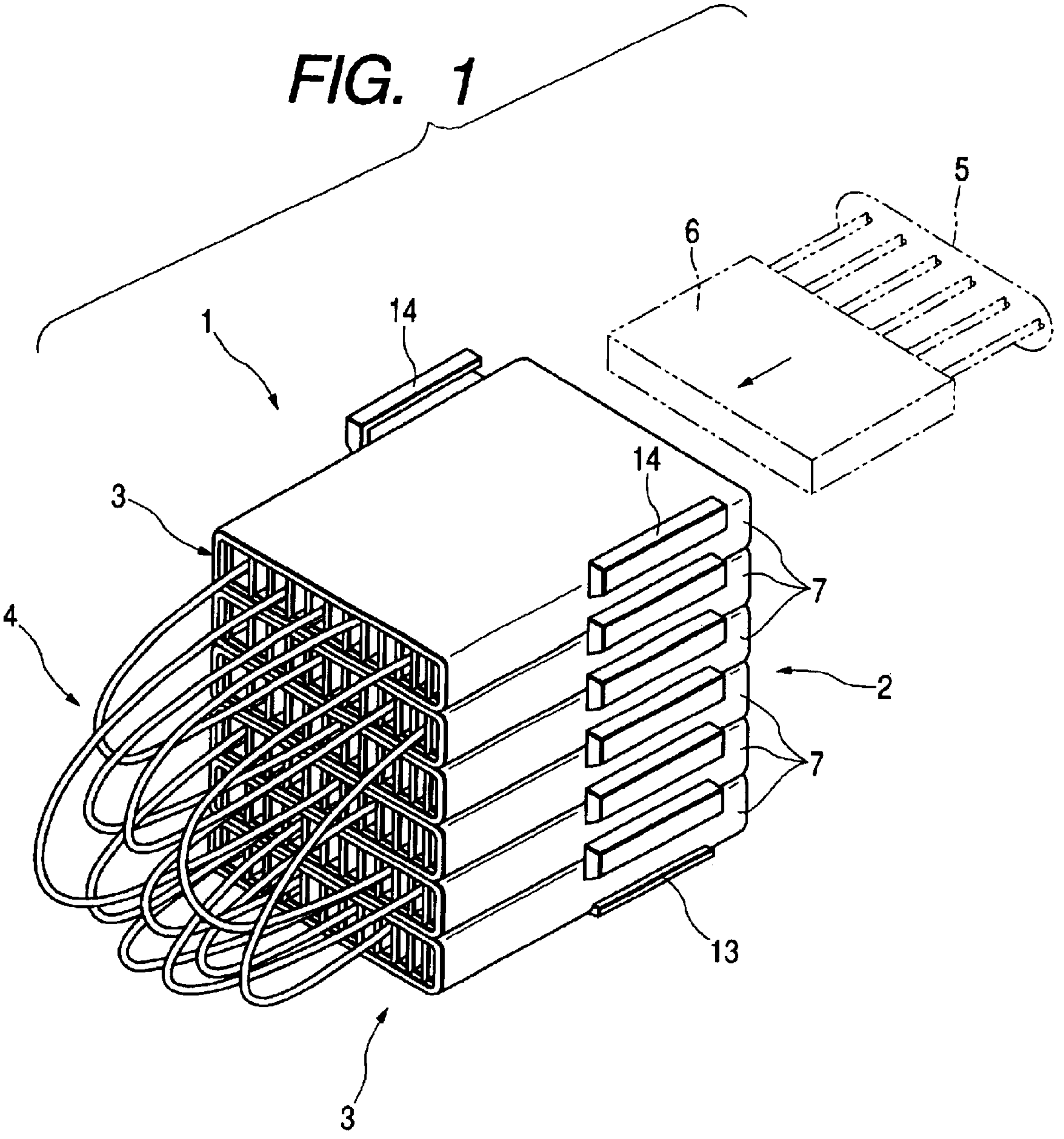
FIG. 1 is a perspective view showing a joint receiving connector according to a first embodiment of the present invention.
Figure 2:
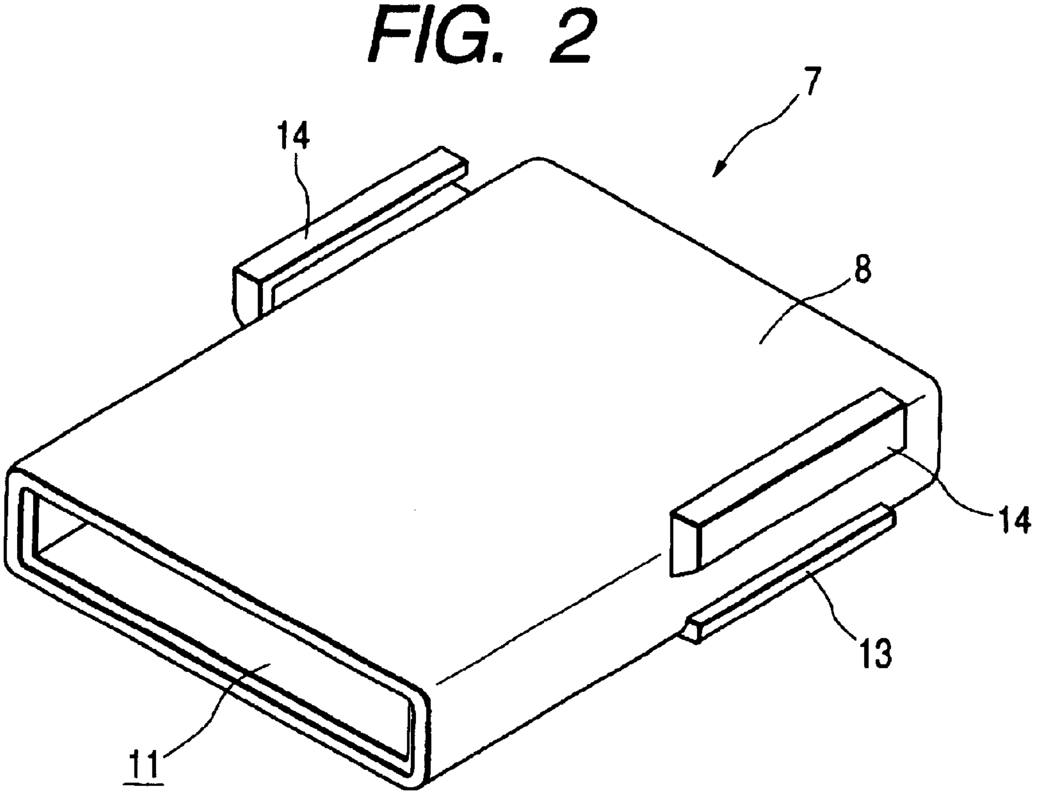
FIG. 2 is a perspective view of a connector subassembly in the joint receiving connector.
Figure 3:
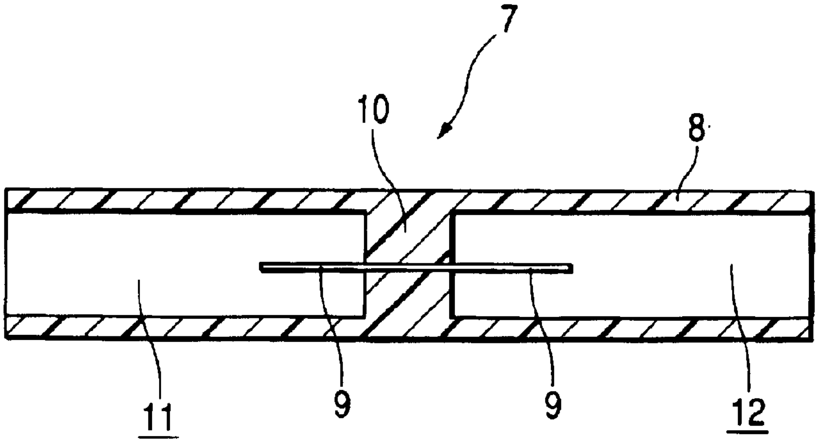
FIG. 3 is a longitudinal sectional view of the connector subassembly.
Figure 4:
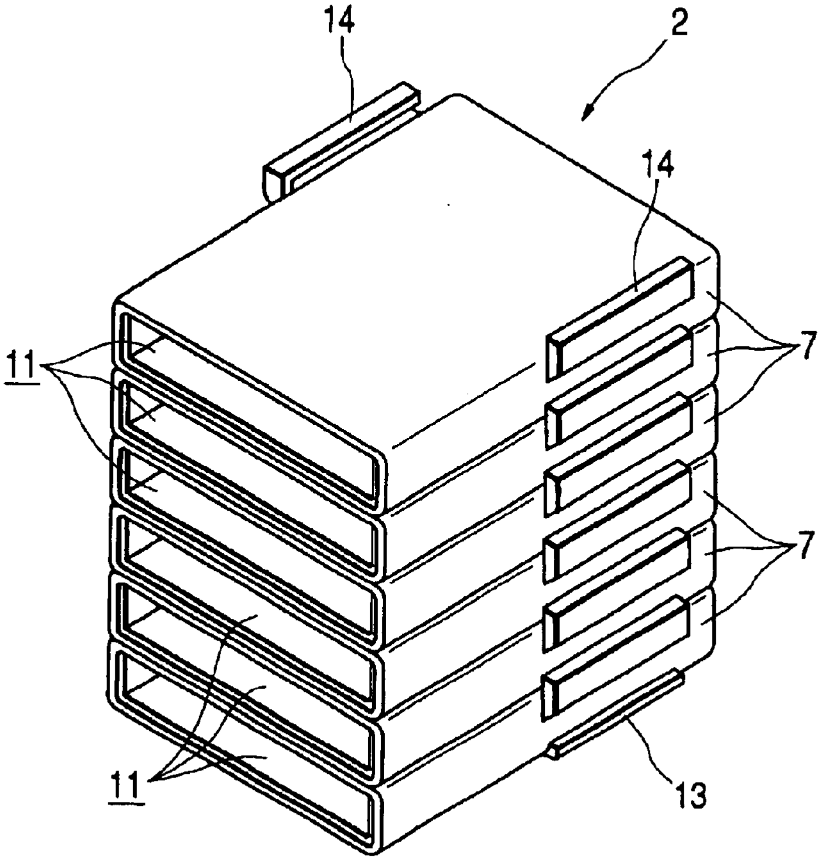
FIG. 4 is a perspective view of a connector assembly in the joint receiving connector.
Figure 5:
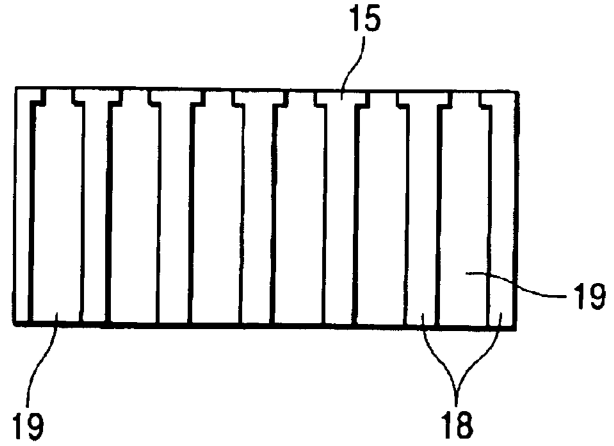
FIG. 5 is an explanatory view of a connector housing provided within the connector subassembly.

In FIG. 1, a joint receiving connector 1 according to a first embodiment of the invention is constructed to have a connector assembly 2, a plurality of connectors 3, and an electric wire group 4, and so adapted to receive a joint (mating connector 6) of a wire harness 5 which is provided at a terminal end of the wire harness 5.

As shown in FIGS. 1 to 4, the connector assembly 2 has a plurality of (six in this embodiment) connector subassemblies 7 which are stacked one on another. Each of the connector subassemblies 7 is designed to have a housing 8 made of synthetic resin and a plurality of male tabs 9 having electrical conductivity. The housing 8 is formed in a box-like shape which is open at a front face and a back face. A partition wall 10 is formed at an intermediate position inside the housing 8, so that there are formed a first connecting space 11 and a second connecting space 12 at both sides of the partition wall 10.

The housing 8 is provided with a pair of engaging portions 13 and a pair of engaged portions 14 on side walls outside thereof. A pair of the engaging portions 13 are located in lower areas, while a pair of the engaged portions 14 are located in upper areas. They are provided for the purpose of stacking and fixing the housings 8 on occasion of forming the connector assembly 2. A pair of the engaging portions 13 of this connector subassembly 7 are adapted to be engaged with a pair of the engaged portions 14 of the connector subassembly 7 in a lower step, and a pair of the engaging portions 13 of the connector subassembly 7 in an upper step are adapted to be engaged with a pair of the engaged portions 14 of this connector subassembly 7.

Each of the male tabs 9 serves as a relay terminal for interconnecting the first connecting space 11 and the second connecting space 12, and arranged on the partition wall 10 to be fixed by crimping or by insertion molding. To the male tab 9 projecting into the first connecting space 11, a crimp terminal 16 (or a chained crimp terminal 17), which will be described below, of the connector 3 is adapted to be electrically connected. To the male tab 9 projecting into the second connecting space 12, a known female terminal, which is not shown, of the connector 6 of the wire harness 5 is adapted to be electrically connected.

As shown in FIGS. 1 and 5 to 7, the connector 3 is constructed to have a housing 15 made of synthetic resin, and a plurality of crimp terminals 16 and/or chained crimp terminals 17 of a known shape. In the housing 15, there are formed a plurality of terminal cavities 19 which are partitioned by respective cavity walls 18. In these terminal cavities 19, there are respectively formed terminal engaging parts which are not shown, and a plurality of the crimp terminals 16 and/or the chained crimp terminals 17 are respectively contained in the terminal cavities 19 in a state engaged with the above mentioned non-shown terminal engaging parts. The chained crimp terminals 17 have connecting members 20 for electrically connecting the adjacent terminals, and are formed in such a shape as to straddle the cavity walls 18.

Electric wires 21 constituting the electric wire group 4 are arranged astride a plurality of the connectors 3. Terminal ends of the electric wires 21 are respectively crimped to wire crimping parts of the corresponding crimp terminals 16 or the chained crimp terminals 17. As for the electric wire group 4, a manner of fixing them is not limited to either of a case in which the electric wires 21 may be arranged after the crimp terminals 16 have been fixed to the housing 15, and a case in which the crimp terminals 16 may be fixed to the housing 15 after the electric wires 21 have been arranged to the crimp terminals 16.

On the basis of the above described structure, an example of method for manufacturing the joint receiving connector 1 will be described. The joint receiving connector 1 is manufactured through the following processes in this embodiment.

As a first step, the connector subassemblies 7 having the above described structure is manufactured.

Then, a plurality of the connector subassemblies 7 are stacked to form the connector assembly 2. In this process, a pair of the engaging portions 13 of one connector subassembly 7 are engaged with a pair of the engaged portions 14 of another connector subassembly 7 in the lower step, and a pair of the engaged portions 14 of the one connector assembly 7 are engaged with a pair of the engaging portions 13 of still another connector subassembly 7 in the upper step. By forming the engaging portions 13 and the engaged portions 14, stacking of the connector subassemblies 7 can be facilitated, and productivity can be enhanced.

Figure 6:
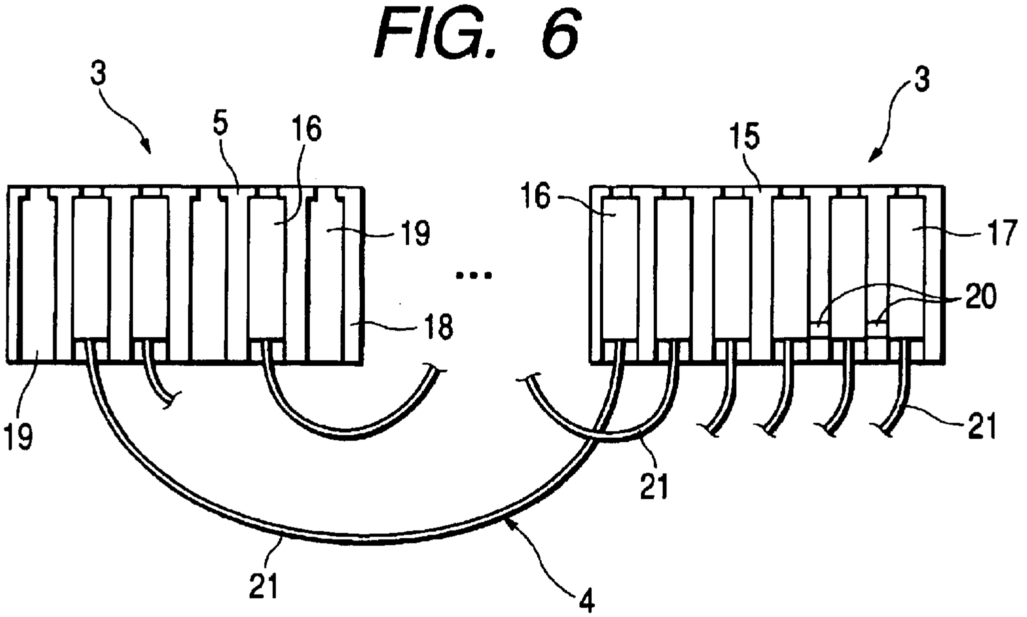
FIG. 6 is an explanatory view showing a condition that connector housings are connected via crimp terminals and electric wires.
Figure 7:
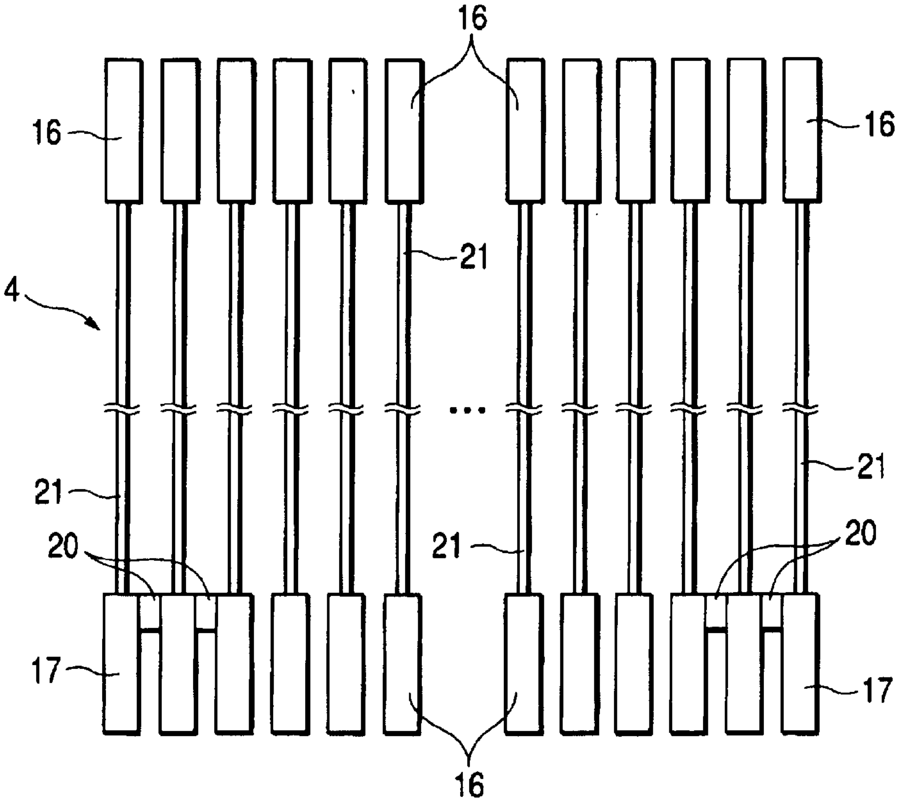
FIG. 7 is an explanatory view of the crimp terminals and the electric wires.

Subsequently, a plurality of the connectors 3 each having the housing 15 and a plurality of the crimp terminals 16 and/or the chained crimp terminals 17 are assembled. Incidentally, the terminal ends of the electric wires 21 are crimped to the crimp terminals 16 and/or the chained crimp terminals 17, and the group 4 of the electric wires are arranged astride a plurality of the crimp terminals 3 as shown in FIG. 6.

Finally, the respective connectors 3 in a state equipped with the electric wire group 4 are inserted into the associated first connecting spaces 11 of the subassemblies 7 in the connector assembly 2, so as to be connected with the male tabs 9.

When the mating connector 6 is connected, via the second connecting spaces 12, with the joint receiving connector 1 which has been assembled through the above described processes, the joint receiving can be performed.

Since the arrangement of the crimp terminals 16 and/or the chained crimp terminals 17 are freely selected in accordance with the arranging requirements of the wire harness 5, and the arrangement of the electric wires 21 are also freely selected, the joint receiving connector 1 has the function capable of complying with the arranging requirements of the wire harness 5.

Consequently, the joint receiving connector 1 can contribute to enhancement of the productivity of the wire harness 5. Moreover, irrespective of the conditions such as vehicle grade, shipment destination or the like, the joint receiving connector 1 can easily perform the joint receiving. Further, by simply modifying the arrangement of the crimp terminals 16, 17 and the electric wires 21, the configuration can be easily altered. Furthermore, needless circuits can be decreased so that the cost can be cut down.

Figure 8A:
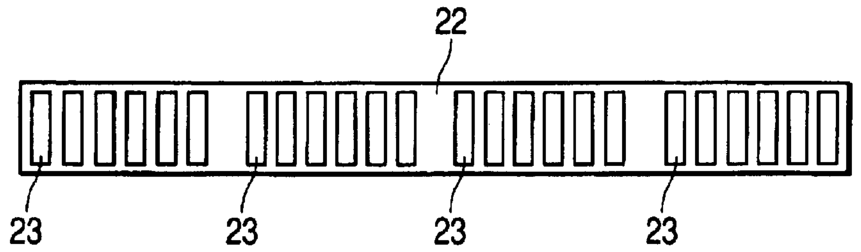
FIGS. 8A to 8C are explanatory views showing how to manufacture a joint receiving connector according to a second embodiment of the invention.
Figure 8B:
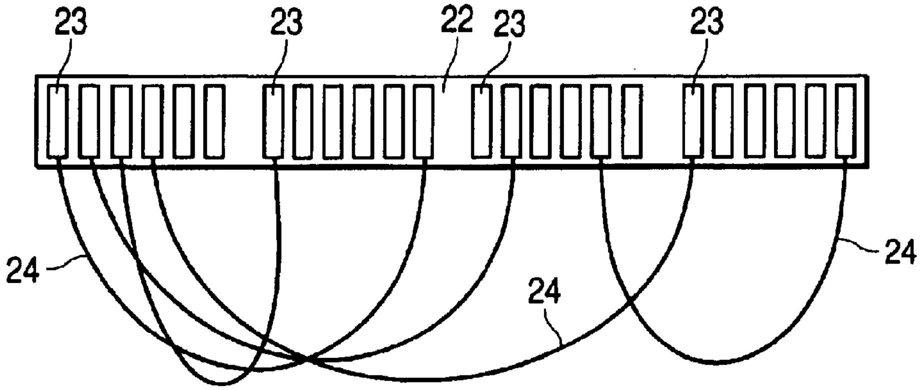
Figure 8C:
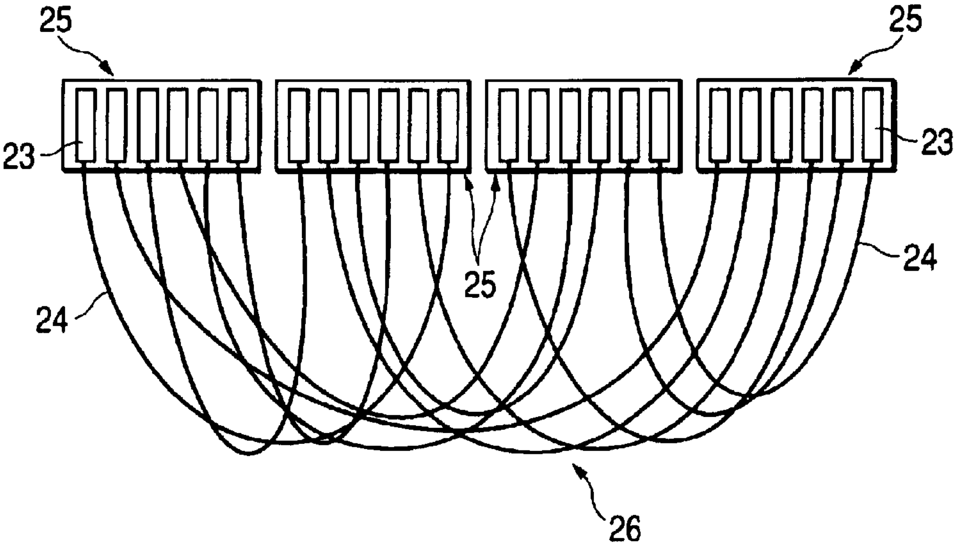

FIGS. 8A to 8C are explanatory views showing how to manufacture a joint receiving terminal 25 according to a second embodiment of the invention.

As a first step, as shown in FIG. 8A, an elongated insulating body 22 is prepared, and crimp terminals 23 of a known shape are fixed to the elongated insulating body 22. Then, electric wires 24 constituting an electric wire group 26 are crimped to the corresponding crimp terminals 23 as shown in FIG. 8B. Finally, the elongated insulating body 22 is cut to a predetermined length as shown in FIG. 8C. The insulating body 22 which has been cut serves as the housings.

As described above, the joint receiving connector 25 can be easily manufactured by employing the elongated insulating body 22.

Figure 9:
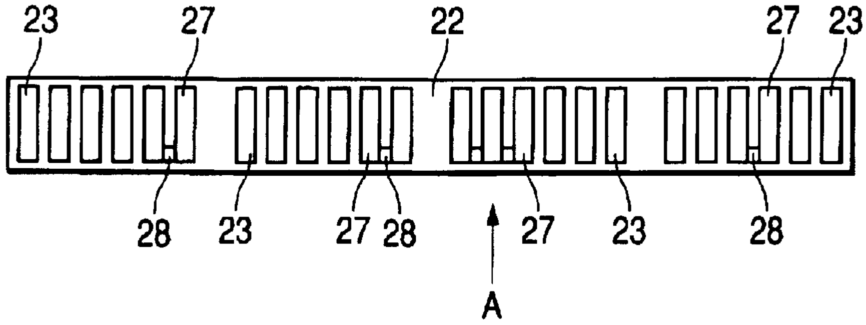
FIGS. 9 and 10 show modified example of the joint receiving connector of the second embodiment.
Figure 10:
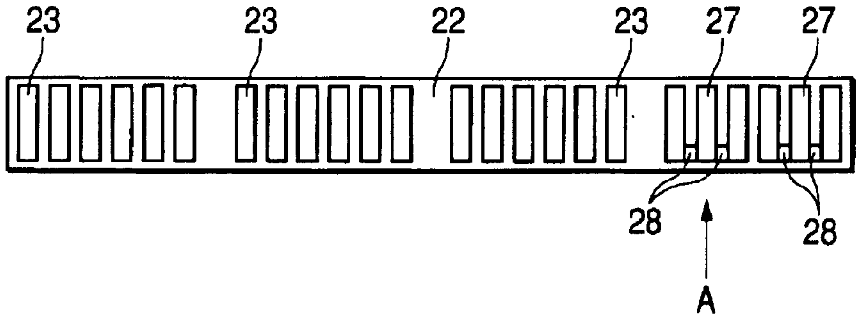
Figure 11:
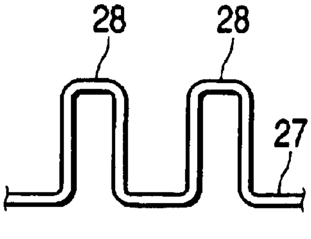
FIG. 11 is an explanatory view of connecting members of a chained crimp terminals as seen in a direction of an arrow A in FIGS. 9 and 10.
Figure 12:
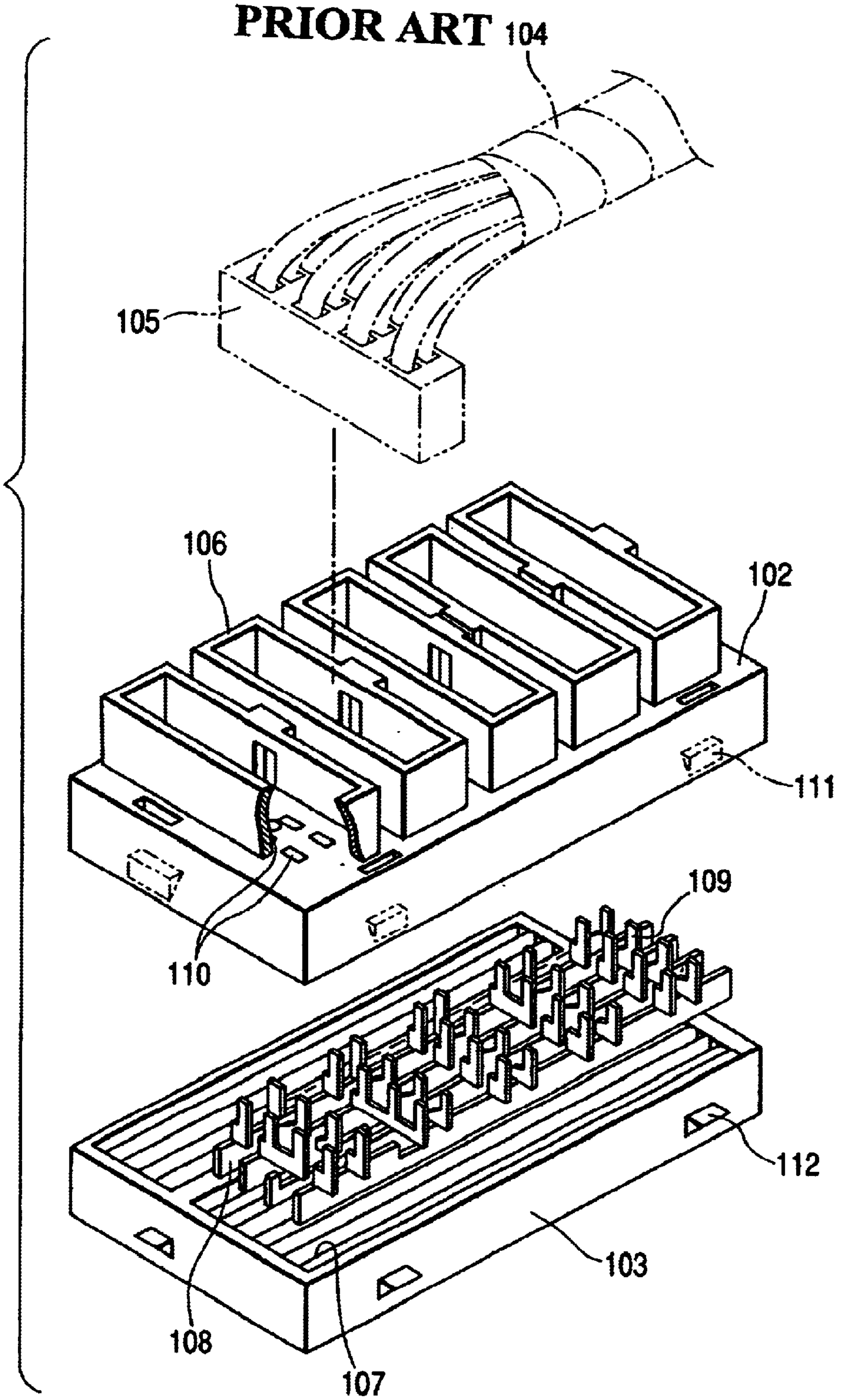
FIG. 12 PRIOR ART
FIG. 12 is an exploded perspective view of a first related-art joint receiving connector.
Figure 13:
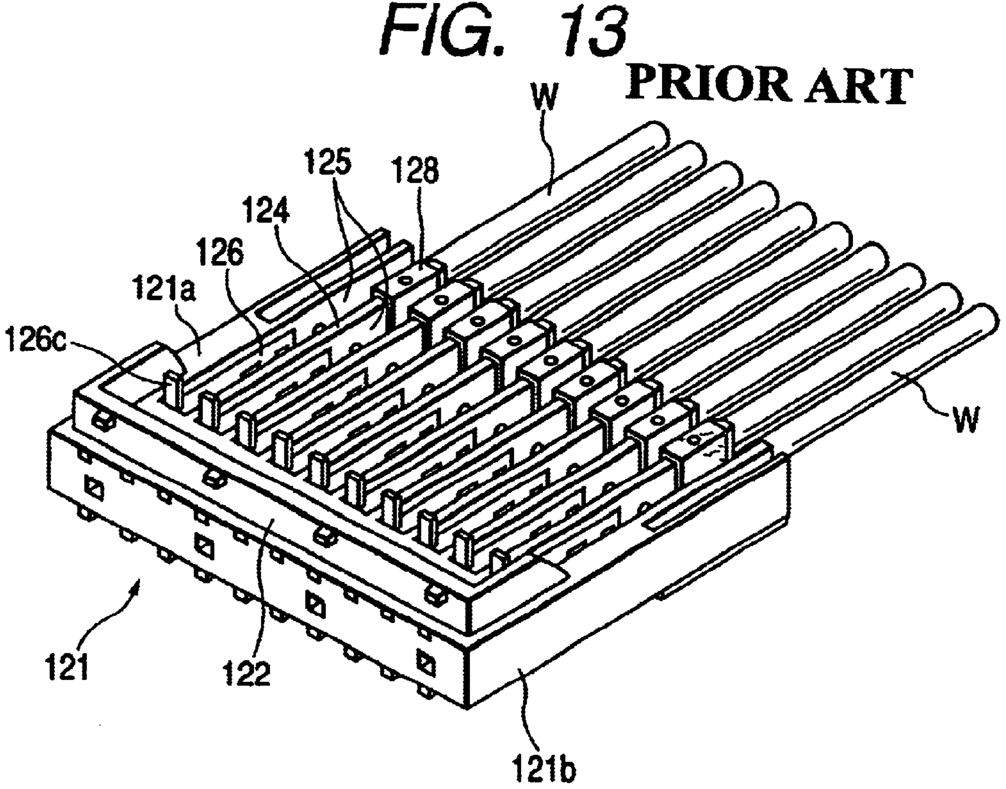
FIG. 13 PRIOR ART
FIG. 13 is a perspective view of a second related-art joint receiving connector.
Figure 14:
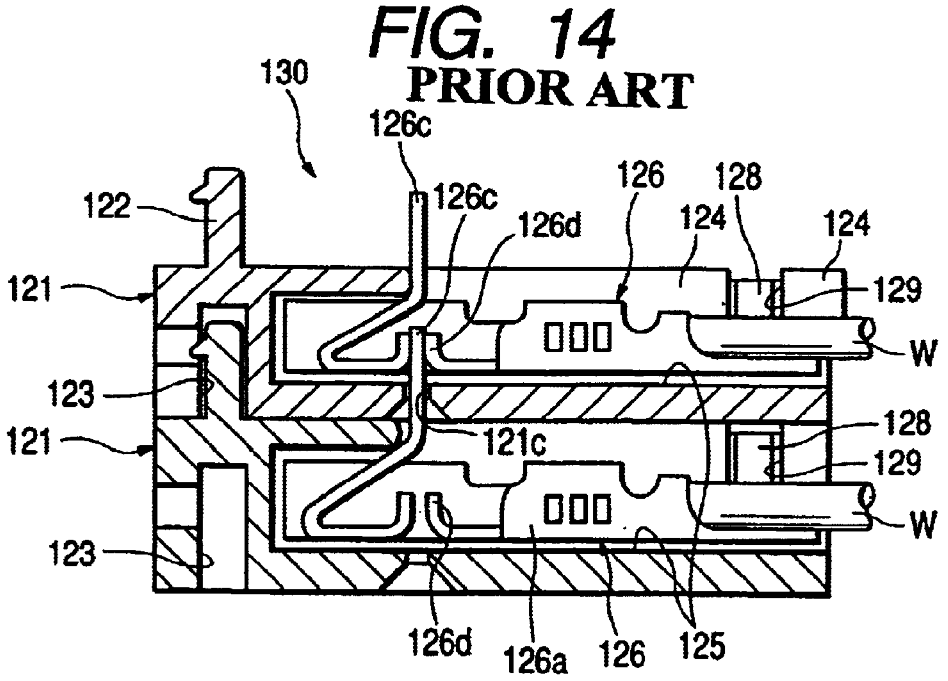
FIG. 14 PRIOR ART
FIG. 14 is a sectional view of the second related-art joint receiving connector.

It is to be noted that a part of the crimp terminals 23 to be fixed to the elongated insulating body 22 may be replaced with chained crimp terminals 27, as shown in FIG. 9. These chained crimp terminals 27 may be fixed collectively to one position as shown in FIG. 10. Connecting members 28 of the chained crimp terminals 27 are formed in an inverted U-shape as shown in FIG. 11. Specifically, in case where cavity walls are formed in the elongated insulating body 22, the connecting members 28 are so designed as to straddle the cavity walls.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A connector assembly for receiving a plurality of mating connectors each provided with a wire harness, comprising:

a plurality of subassemblies, each provided with a first internal space and a second internal space which are defined by an internal partition wall, and conductive tabs piercing the partition wall so as to project into both of the first internal space and the second internal space, the subassemblies being stacked one on another;

a plurality of connectors, each of which is inserted into the first internal space of an associated one of the subassemblies;

a plurality of terminals, provided in each of the connectors to be electrically connected to the conductive tabs; and at least one electric wire, a first end of which is connected to one of the terminals which is provided in one of the connectors, and a second end of which is connected to another one of the terminals which is provided in another one of the connectors, wherein each of the mating connector is inserted into the second internal space of an associated one of the subassemblies, to be electrically connected to the conductive tabs.

2. The connector assembly as set forth in claim 1, wherein the connectors connected by the electric wire is so selected as to match with a wire arranging requirement of the wire harness.

3. The connector assembly as set forth in claim 1, wherein the terminals includes a chained terminal which electrically connects adjacent ones of the terminals.

4. The connector assembly as set forth in claim 3, wherein a position at which the chained terminal is provided is so selected as to match with an wire arranging requirement of the wire harness.

5. The connector assembly as set forth in claim 1, wherein each of the subassemblies is provided with an engaging member which engages with a stacked one of the subassemblies.

6. A method of manufacturing a connector assembly, comprising steps of:

providing a plurality of subassemblies, each provided with a first internal space and a second internal space which are defined by an internal partition wall, and a conductive tab piercing the partition wall so as to project into both of the first internal space and the second internal space;

stacking the subassemblies one on another;

providing a plurality of connectors, each of which is provided with a plurality of terminals;

connecting a first end of an electric wire to one of the terminals which is provided in one of the connectors;

connecting a second end of the electric wire to another one of the terminals which is provided in another one of the connectors;

inserting each of the connectors into the first internal space of an associated one of the subassemblies, so that the terminals are electrically connected with the conductive tabs;

providing mating connector each provided with a wire harness; and inserting each of the mating connector into the second internal space of an associated one of the subassemblies, to be electrically connected to the conductive tabs.

7. The manufacturing method as set forth in claim 6, wherein the step of providing the connectors includes steps of:

providing an insulating body;

fixing the terminals on the insulating body; and dividing the insulating body to form the connectors.

8. The manufacturing method as set forth in claim 6, the connectors connected by the electric wire is so selected as to match with an wire arranging requirement of the wire harness.

9. The manufacturing method as set forth in claim 6, wherein the step of providing the connectors includes step of providing a chained terminal which electrically connects adjacent ones of the terminals.

10. The manufacturing method as set forth in claim 9, wherein a position at which the chained terminal is provided is so selected as to match with an wire arranging requirement of the wire harness.

* * * * *